US010692181B2

(12) United States Patent
Shimazaki

(10) Patent No.: US 10,692,181 B2
(45) Date of Patent: Jun. 23, 2020

(54) DISPLAY DEVICE THAT REDUCES AN IMAGE WHILE PERFORMING FILTER PROCESSING ON THE IMAGE

(71) Applicant: Panasonic Intellectual Property Management Co., Ltd., Osaka (JP)

(72) Inventor: Hiroaki Shimazaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 82 days.

(21) Appl. No.: 16/138,065

(22) Filed: Sep. 21, 2018

(65) Prior Publication Data
US 2019/0026860 A1     Jan. 24, 2019

Related U.S. Application Data

(63) Continuation of application No. PCT/JP2016/004143, filed on Sep. 12, 2016.

(30) Foreign Application Priority Data

Mar. 24, 2016 (JP) .................................. 2016-060929

(51) Int. Cl.
*G06T 3/40* (2006.01)
*G09G 5/391* (2006.01)
(Continued)

(52) U.S. Cl.
CPC .............. *G06T 3/403* (2013.01); *G06T 5/002* (2013.01); *G06T 5/20* (2013.01); *G09G 5/391* (2013.01);
(Continued)

(58) Field of Classification Search
CPC ........... G06T 3/403; G06T 5/20; G06T 5/002; G06T 2207/20008; G06T 2207/20004;
(Continued)

(56) References Cited

U.S. PATENT DOCUMENTS 5,418,899 A    5/1995  Aoki et al.
2012/0056903 A1  3/2012  Shinohara et al.

FOREIGN PATENT DOCUMENTS

JP    5-328106    12/1993
JP    7-287560    10/1995
(Continued)

OTHER PUBLICATIONS

International Preliminary Report on Patentability dated Oct. 4, 2018 in International (PCT) Application No. PCT/JP2016/004143.
(Continued)

*Primary Examiner* — Maurice L. McDowell, Jr.
(74) *Attorney, Agent, or Firm* — Wenderoth, Lind & Ponack, L.L.P.

(57) ABSTRACT

A display device includes a wireframe image determining unit for determining whether an image indicated by image data is a wireframe image, a filter characteristic setting unit for setting filter characteristics to suppress a high frequency component of the image when the image indicated by the image data is not a wireframe image, and setting the filter characteristics to suppress more the high frequency component compared to when the image is not the wireframe image when the image indicated by the image is the wireframe image, a filtering processor for reducing the image indicated by the image data while performing filter processing on the image based on the set filter characteristics to generate a filtered image, a display processor for generating a display image, inputting the filtered image, and arranging the filtered image on the display image, and a display unit for displaying the display image.

12 Claims, 12 Drawing Sheets

(51) Int. Cl.
　　　*G06T 5/00*　　　(2006.01)
　　　*G06T 5/20*　　　(2006.01)
(52) U.S. Cl.
　　　CPC ............... *G06T 2207/10024* (2013.01); *G06T 2207/20004* (2013.01); *G06T 2207/20008* (2013.01); *G09G 2320/0247* (2013.01); *G09G 2340/0407* (2013.01)
(58) Field of Classification Search
　　　CPC .......... G06T 2207/10024; G09G 5/391; G09G 2320/0247; G09G 2340/0407
　　　See application file for complete search history.

(56)　　　　　　　References Cited

FOREIGN PATENT DOCUMENTS

| | | |
|---|---|---|
| JP | 2001-189850 | 7/2001 |
| JP | 2011-139158 | 7/2011 |
| WO | 2010/109570 | 9/2010 |

OTHER PUBLICATIONS

International Search Report dated Dec. 13, 2016 in International (PCT) Application No. PCT/JP2016/004143.

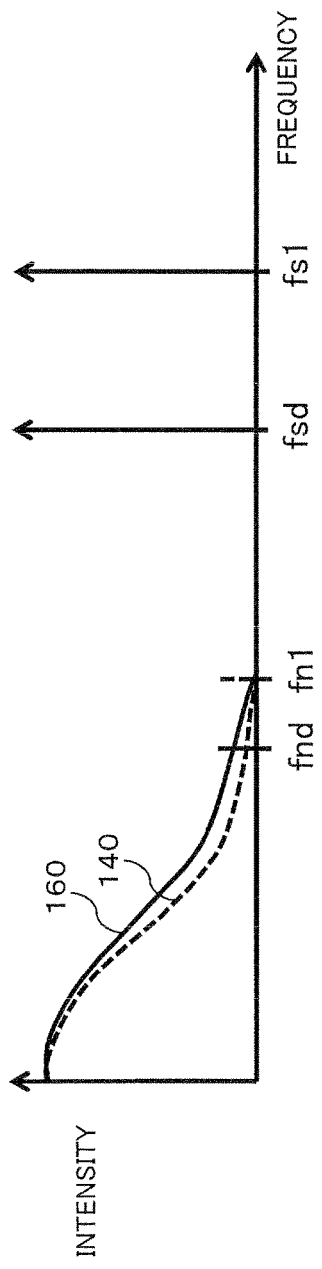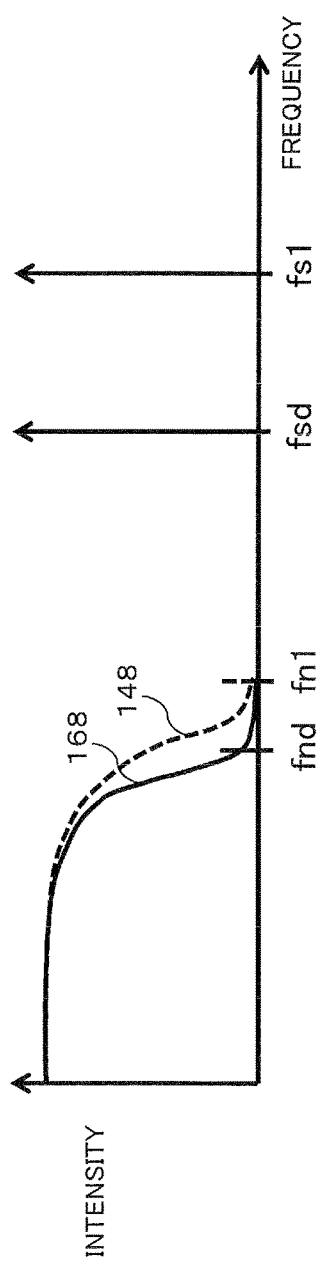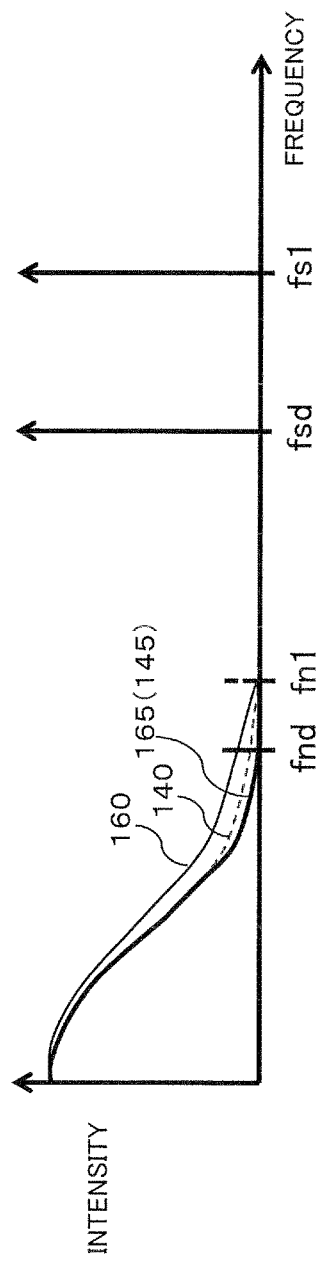

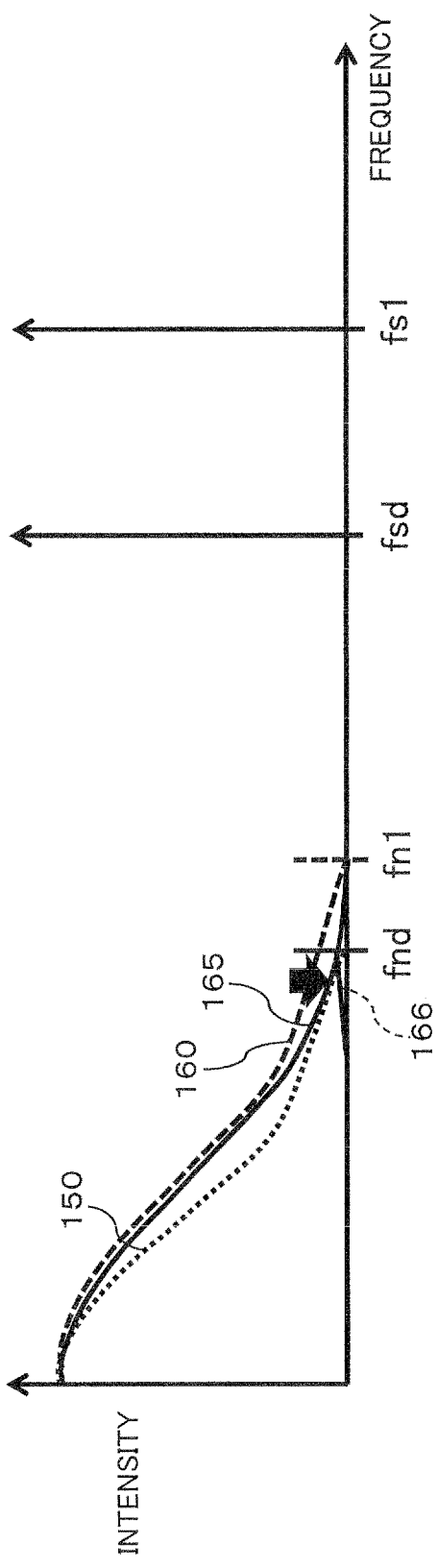
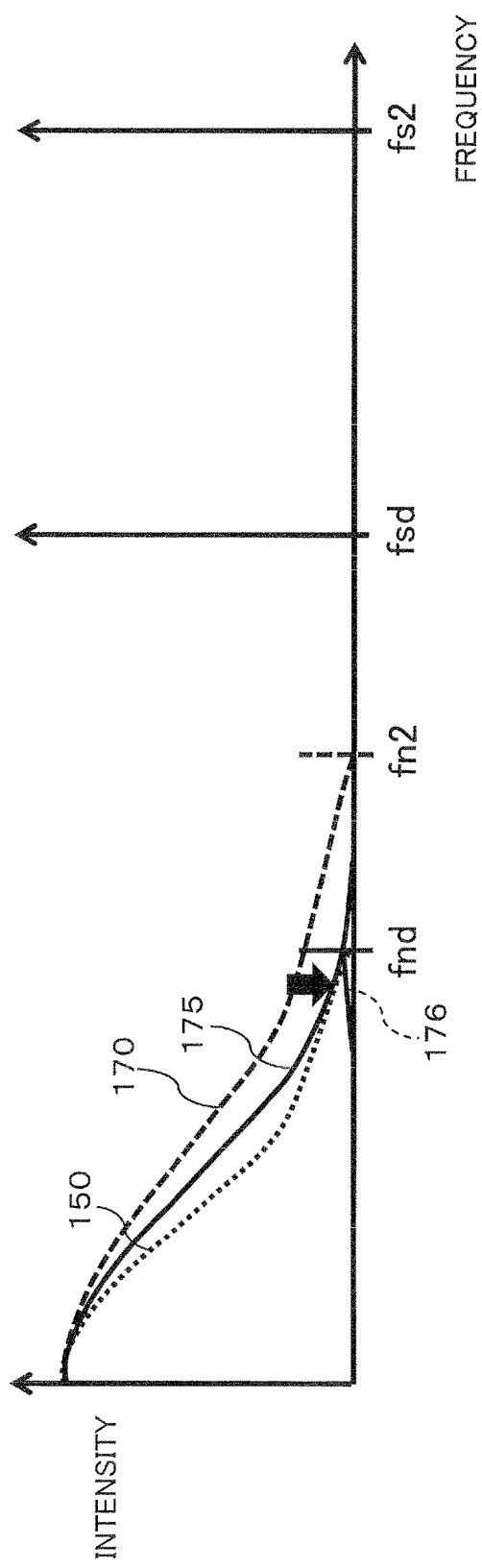
Fig. 7A
Fig. 7B

DISPLAY DEVICE THAT REDUCES AN IMAGE WHILE PERFORMING FILTER PROCESSING ON THE IMAGE

CROSS-REFERENCE

This is a continuation application of International Application No. PCT/JP2016/004143, with an international filing date of Sep. 12, 2016, which claims priority of Japanese Patent Application No.: 2016-060929 filed on Mar. 24, 2016, the content of which is incorporated herein by reference.

BACKGROUND

1. Technical Field

The present disclosure relates to a display device for displaying an image by reducing or enlarging the image.

2. Related Art

Japanese unexamined patent publication JP2001-189850A discloses a resolution conversion device for an image processing apparatus, which converts resolution of an image. The resolution conversion device includes an image property detection circuit for determining whether characters or natural images from a video signal indicating an image in which characters and natural images coexist, an interpolation function generation circuit for generating an interpolation function by a cubic convolution method based on the result of determination whether characters or natural images, and a resolution conversion circuit for performing resolution conversion which reduces or enlarges the video signal based on the interpolation function output from the interpolation function generation circuit.

Specifically, text characters often change in luminance and hues accompanied by abrupt changes with respect to the background, often causing high frequency components. Therefore, when it is determined to be a text character, the interpolation function is calculated with a constant "a" for controlling the interpolation characteristics being set to a value −2 at which the interpolation curve is steep and the sharpness increases in interpolation characteristics. On the other hand, in the case of a natural image, in general, there is a gradually increasing and decreasing change in luminance and hue with artificially created artifacts such as buildings and crossovers constructed in nature, so that there is little sharp change in luminance and hue and there is little amount of high frequency components. Therefore, when it is determined to be a natural image, the interpolation function is calculated with the constant "a" being set to a value −0.5 at which the interpolation curve is moderate and the interpolation characteristics are for common natural images. In this way, it is possible to perform resolution conversion processing having optimal characteristics for property of each of images.

SUMMARY

For example, when a wire frame image drawn with a thin line using a CAD tool is displayed in a reduced size, if the constant "a" for controlling the interpolation characteristics as in the case of the text character described in Japanese unexamined patent publication JP2001-189850A is set to a value that provides the steep interpolation curve and increases the sharpness, jaggy would occur in the reduced display image.

The present disclosure provides a display device that suppresses occurrence of jaggy when a wire frame image is displayed in a reduced size.

A display device of the present disclosure includes: an image determining unit configured to determine whether an image indicated by image data is a wire frame image drawn with thin lines; a first filter characteristic setting unit configured to set filter characteristics so as to suppress high frequency components of the image when the image indicated by the image data is not the wire frame image, and set filter characteristics so as to suppress more high frequency components when the image indicated by the image data is the wire frame image, as compared with suppressed amount of high frequency components when the image indicated by the image data is not the wire frame image; a first filtering processor configured to reduce the image indicated by the image data while performing filter processing on the image indicated by the image data to generate a filtered image, based on the filter characteristics set by the first filter characteristic setting unit; a display processor configured to generate a display image and input the filtered image to arrange the filtering image on the display image; and a display unit configured to display the display image.

The display device according to the present disclosure can prevent occurrence of jaggy when a wire frame image is displayed in a reduced size.

BRIEF DESCRIPTION OF DRAWINGS

FIG. 5A is a diagram showing frequency characteristics for signal components contained in a reduced image obtained by reducing a natural image and signal components contained in a wire frame image.

FIG. 5B is a diagram showing filter characteristics with a first filter coefficient and filter characteristics with a second filter coefficient.

FIG. 5C is a diagram showing frequency characteristics of signal components contained in the reduced image on which filter processing of the present embodiment is applied.

FIG. 7A is a diagram showing frequency characteristics of a wire frame image on which filter processing of the first embodiment is performed, and FIG. 7B is a diagram showing frequency characteristics of the wire frame image on which filter processing of the first embodiment is performed.

DETAILED DESCRIPTION OF EMBODIMENTS

In the following, embodiments will be described in detail with reference to the drawings as appropriate. However, a detailed description more than necessary may be omitted. For example, a detailed description of already well-known matters and an overlapping description for substantially the same configuration may be omitted. This is to avoid the unnecessary redundancy of the following description and to facilitate understanding by those skilled in the art.

It should be noted that the inventor(s) provides (provide) the accompanying drawings and the following description for a person skilled in the art to fully understand the present disclosure. Thus, the drawings and the description are not intended to limit the subject matter defined in the claims.

Background of the Present Disclosure

A high resolution (a large number of pixels) display device such as an 8K display is suitable for applications to display a natural image such as a photograph or a computer graphic close to a photograph, a wire frame image drawn with a thin line using a CAD tool, and the like. For such a display device, it is preferable to display the image at a so-called pixel-to-pixel display so that the number of pixels of the original image is equal to that of the display device in order to achieve a high-resolution display. In this case, the sampling frequency of the original image is the same as the sampling frequency of the display device. In addition, the maximum frequency of the signal components contained in the image is set to a frequency equal to or not more than half the sampling frequency (Nyquist frequency) (Sampling Theorem).

However, such a display device might occasionally reduce and display the image according to the window size as necessary.

Figure 1A:
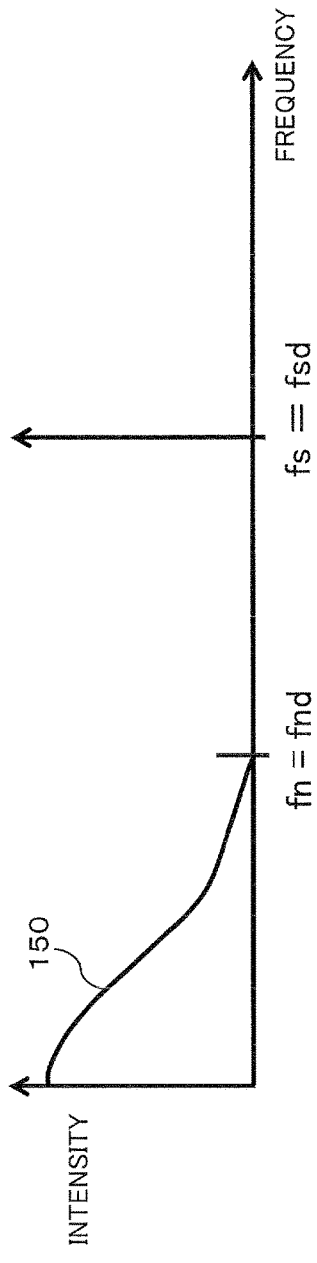
FIG. 1A is a diagram showing frequency characteristics of signal components contained in an image when the image is displayed without being reduced.
Figure 1B:
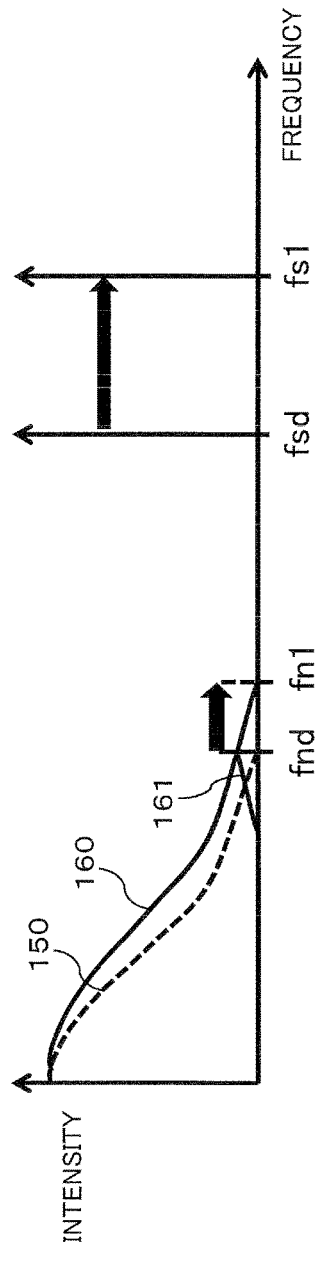
FIG. 1B is a diagram showing frequency characteristics of signal components contained in the reduced image when the image is reduced and displayed (with small reduction rate).
Figure 1C:
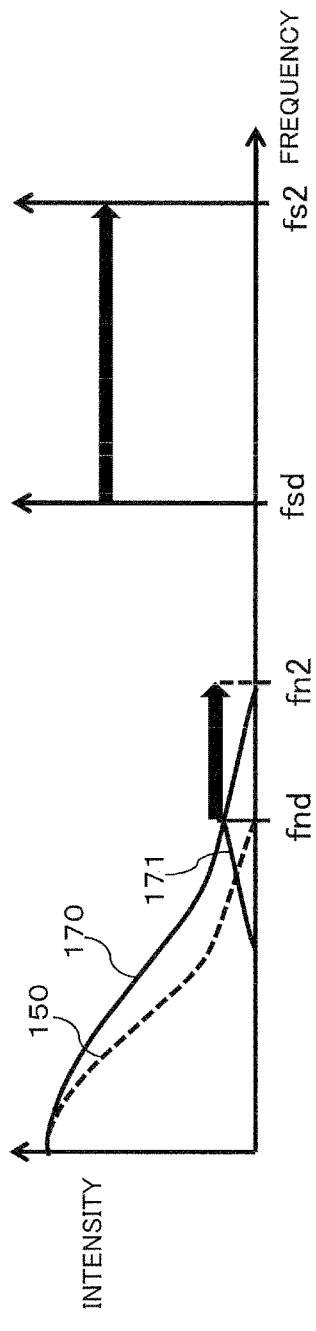
FIG. 1C is a diagram showing frequency characteristics of signal components contained in the reduced image when the image is reduced and displayed (with high reduction rate).

FIG. 1A is a diagram showing frequency characteristics of signal components contained in an image when the image is displayed without reducing the image, and FIGS. 1B and 1C are diagrams showing frequency characteristics of signal components contained in the reduced image when the image is reduced and displayed. It should be noted that FIG. 1C shows the characteristics with a higher reduction rate than that of FIG. 1B.

In the case of not reducing the image, as shown in FIG. 1A, the sampling frequency fs of the image and the sampling frequency fsd of the display unit substantially coincide with each other, and the maximum frequency of the signal components 150 contained in the image is set to the Nyquist frequency fn (½ of fs) of the image and the Nyquist frequency fnd (½ of fsd) of the display unit. On the other hand, when the image is reduced, as shown in FIG. 1B, the sampling frequency fs1 of the reduced image becomes higher than the sampling frequency fsd of the display unit, and the maximum frequency and the Nyquist frequency fn1 (½ of fs1) of the signal components 160 contained in the reduced image are higher than the Nyquist frequency fnd (½ of fsd) of the display unit. When this reduced image is displayed on the display unit having the sampling frequency fsd, the signal components (shown folded back) 161 having a frequency higher than the Nyquist frequency fnd of the display unit becomes aliasing noise.

When the reduction rate of the image is further increased, as shown in FIG. 1C, the sampling frequency fs2 of the reduced image further increases, and the maximum frequency and the Nyquist frequency fn2 (½ of fs2) of the signal components 170 contained in the reduced image further increase. Therefore, the signal components (shown folded back) 171 having a frequency higher than the Nyquist frequency fnd of the display unit, that is, aliasing noise increases.

In particular, since a wire frame image contains a larger amount of high frequency components than a natural image, reducing the wire frame image generates a larger amount of aliasing noise than reducing the natural image.

Figure 2:
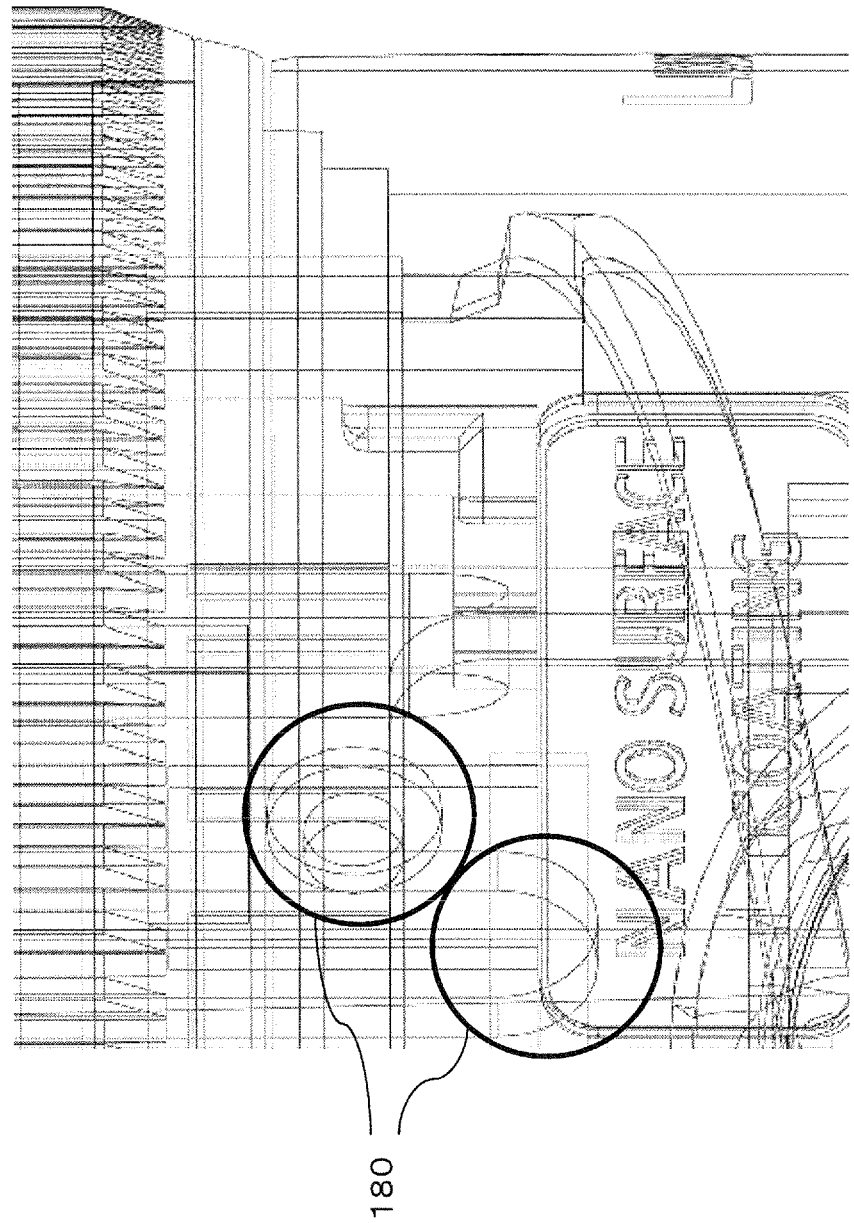
FIG. 2 is a diagram showing an example of a display when a wire frame image is displayed.

FIG. 2 is a diagram showing an example of display when the wire frame image is reduced and displayed. In FIG. 2, the image is reduced in size from 3840 pixels to 2000 pixels in the horizontal direction. Reducing the wire frame image causes jaggy to occur due to generation of much aliasing noise (see, for example, the circular range 180). Furthermore, increasing the reduction rate of the wire frame image could produce moire.

It is noted that a natural image has a relatively small amount of high frequency components, thus even if the natural image is displayed in a reduced size, the amount of aliasing noise to occur is small, so that jaggy does not occur, or is inconspicuous even though it occurs.

In the present disclosure, the filter processing is applied to wire frame images so as to suppress (reduce) more high frequency components in wire frame images than high frequency components in natural images, and the occurrence of jaggy in the reduced display image is suppressed. In the following, embodiments of the present disclosure will be described.

First Embodiment

The first embodiment is described below with reference to FIGS. 3 to 9.

1-1. Configuration

Figure 3:
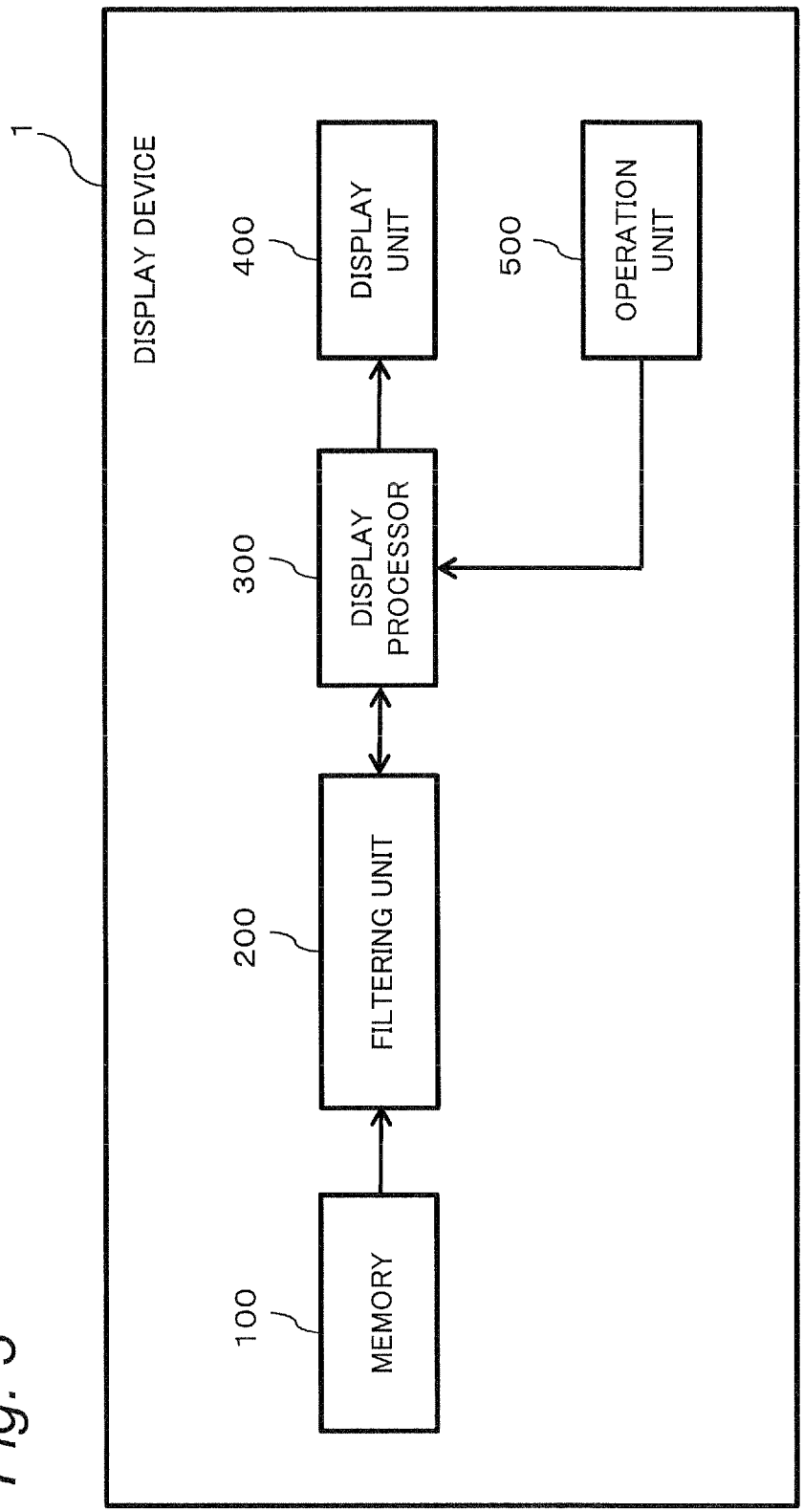
FIG. 3 is a block diagram showing a configuration of a display device according to a first embodiment.

FIG. 3 is a block diagram showing a configuration of a display device according to the first embodiment. The display device 1 displays one or a plurality of windows in one screen and displays still images such as a natural image and a wire frame image within the frame of each window. In this case, the display device 1 can reduce the display image including the frame of the window and the still image by changing the size of the frame of the window. At that time, the still image is reduced and arranged within the frame of the window (that is, on the window). It should be noted that the display device 1 may display moving images. The display device 1 includes a memory 100, a filtering unit 200, a display processor 300, a display unit 400, and an operation unit 500.

The memory 100 is a storage device and includes an SSD, a flash memory, a ferroelectric memory, or the like. Alternatively, the memory 100 may be realized by a volatile storage device such as a DRAM, and data may be read from an external recording device such as an HDD. The memory 100 stores high resolution image data for the high resolution display unit 400 and additional information on the image data. The image data is data of an image generated with a sampling frequency substantially the same as the sampling frequency of the display unit 400. The additional information includes image resolution information, image creation application (software) information, user setting information, and the like. For example, the image creation application information is information indicating a CAD application that creates a wire frame image when the image indicated by the image data is a wire frame image. When the image indicated by the image data is a natural image, the image creation application information is information indicating an editing application corresponding to the natural image. The user setting information is information to be set when the user stores the image data in the memory 100, and is information indicating whether or not the image indicated by the image data is a wire frame image. The memory 100 stores various programs for the filtering unit 200 and the display processor 300. In addition, the memory 100 previously stores appropriate filter coefficients with respect to the reduction rates of a wire frame image as a reference table as shown in the following Table 1.

TABLE 1

| Reduction rate | First filter coefficient | Second filter coefficient |
|---|---|---|
| R1 | a11 | a21 |
| R2 | a12 | a22 |
| R3 | a13 | a23 |
| ... | ... | ... |

The filtering unit 200 includes a GPU, a CPU, an MPU, and the like, and functions as a digital filter circuit by executing various programs stored in the memory 100. In the present embodiment, the filtering unit 200 functions as an interpolation filter circuit of the bicubic method (cubic convolution), and suppresses high frequency components of the image indicated by the image data stored in the memory 100 to generate filtered image data. In this case, the filtering unit 200 determines whether or not the image indicated by the image data is a wire frame image. When the image indicated by the image data is a wire frame image, the filtering unit 200 suppresses high frequency components more than the high frequency components occurred when the image is a natural image. The filtering unit 200 functions as a wire frame image determination unit, a filter characteristic setting unit, and a filtering processor. Details of these functions will be described below.

The display processor 300 includes a graphic card including, for example, a GPU, an MPU, and the like, and executes various programs stored in the memory 100. Thus, the display processor 300 outputs window resolution information for designating the resolution of the filtered image data to the filtering unit 200 based on the display screen configuration set by the user from the operation unit 500, and performs processing such as adding a window frame on the filtering image data from the filtering unit 200 to generate a display image, and causes this display image to be displayed on the display unit 400.

It should be noted that the functions of the filtering unit 200 and the display processor 300 are achieved by cooperation of hardware and software, but the filtering unit 200 and the display processor 300 may be achieved by only a hardware circuit exclusively designed so as to achieve predetermined functions. For example, the filtering unit 200 and the display processor 300 can be realized by not only with a GPU, a CPU, and an MPU, but also by a DSP, an FPGA, an ASIC, and the like.

The display unit 400 is a high resolution display device such as a liquid crystal display or an organic EL display. The display unit 400 displays one or a plurality of windows side by side in one screen, and displays different images in the respective windows to display a plurality of images in one screen. The display unit 400 samples a display image from the display processor 300 with the sampling frequency to display the image in each window.

The operation unit 500 is an operation device such as a capacitive touch panel or an operation button. The operation unit 500 is used for setting various kinds of display settings, reduction rates, and the like.

1-2. Operation

Figure 4:
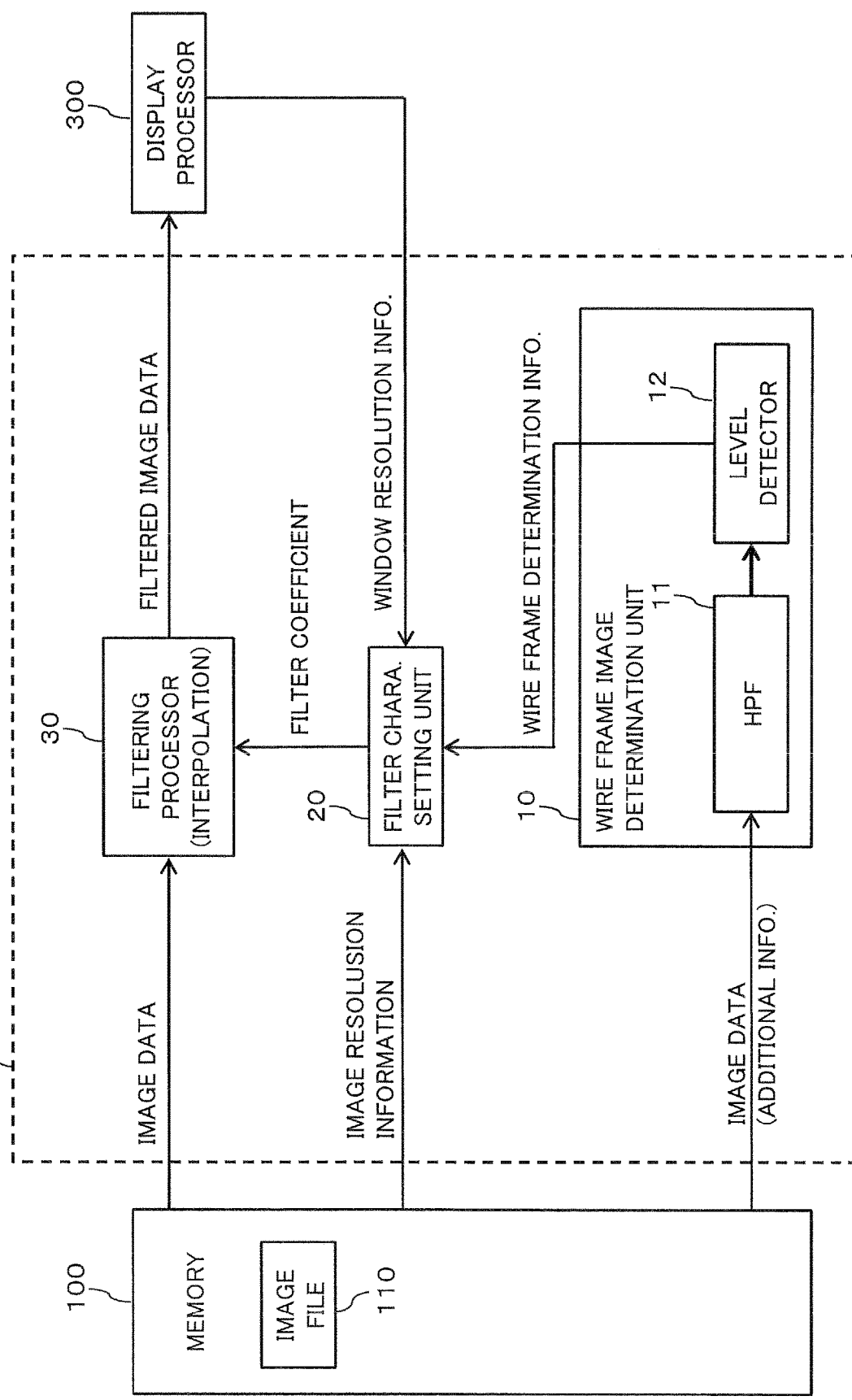
FIG. 4 is a block diagram showing a functional configuration of a filtering unit of the display device according to the first embodiment.

The operation of the display device 1 configured as described above is described below. FIG. 4 is a block diagram showing a functional configuration of the filtering unit 200. The memory 100 stores an image file 110 in which image data and additional information related to this image data are associated. The additional information includes image resolution information, image creation application (software) information, user setting information, and the like.

The wire frame image determining unit 10 determines whether or not the image indicated by the image data is a wire frame image based on the amount of the high-frequency components in the signal components contained in the image indicated by the image data read from the memory 100. Specifically, the wire frame image determining unit 10 determines that the image indicated by the image data is a wire frame image, when the amount of the high frequency components is not less than the predetermined amount. The wire frame image determining unit 10 determines that the image indicated by the image data is not a wire frame image but a natural image, when the amount of the high frequency components is less than the predetermined amount. The wire frame image determining unit 10 outputs the determination result as wire frame determination information. In the present embodiment, the frequency components having frequency ranging from the frequency 0.5 times the Nyquist frequency to the Nyquist frequency are set as the high frequency components.

The wire frame image determining unit 10 includes a high pass filter 11 and a level detector 12. The high pass filter 11 is a filter that allows high-frequency components in signal components contained in the image indicated by the image data to pass and does not allow low-frequency components to pass. The level detector 12 detects amplitude of a signal containing high frequency components passing through the high pass filter 11, and determines that the image indicated by the image data is a wire frame image when the detected amplitude is not less than a predetermined value. It should be noted that when the amount of the high frequency components is large, the amplitude of the high frequency components is also large. Therefore, in the present embodiment, by detecting the amplitude of the high frequency components, the amount of the high frequency components is detected.

The filter characteristic setting unit (first filter characteristic setting unit) 20 sets filter characteristics of the filtering processor 30 by setting filter coefficients based on wire frame determination information output from the wire frame image determining unit 10. Specifically, when the wire frame determination information does not indicate a wire frame image (when the image indicated by the image data is a natural image), the filter characteristic setting unit 20 sets the first filter coefficient as the filter coefficient "a" so that the filter characteristics relatively less suppresses the amount of high frequency components. On the other hand, when the wire frame determination information indicates a wire frame image, the filter characteristic setting unit 20 sets the second filter coefficient as the filter coefficient "a" so as to suppress a larger amount of high frequency components than the case of using the first filter coefficient.

FIG. 5A is a diagram showing the frequency characteristics of the signal components 140 contained in the reduced image obtained by reducing a natural image and the frequency characteristics of the signal components 160 contained in the reduced image obtained by reducing a wire frame image. FIG. 5B is a diagram showing the filter characteristics 148 with the first filter coefficient and the filter characteristics 168 with the second filter coefficient.

As shown in FIG. 5A, since a natural image has a relatively small amount of high frequency components, even if the natural image is reduced, the amount of signal components having a frequency higher than the Nyquist frequency fnd of the display unit in the signal components 140 contained in the reduced image, that is, the amount of aliasing noise is relatively small. On the other hand, since a wire frame image contains a larger amount of high frequency components than a natural image, when the wire frame image is reduced, the amount of signal components having a frequency higher than the Nyquist frequency fnd of the display unit in the signal components 160 contained in the reduced image, that is, the amount of aliasing noise is large.

Thus, when the image indicated by the image data is a natural image, as shown in FIG. 5B, the filter characteristic setting unit 20 sets a first filter coefficient as the filter coefficient "a" so as to obtain the filter characteristics 148 which relatively less suppress the high frequency components. On the other hand, when the image indicated by the image data is a wire frame image, the filter characteristic setting unit 20 sets the second filter coefficient as the filter coefficient "a" so as to obtain filter characteristics 168 for suppressing a larger amount of high frequency components than the first filter coefficient.

FIG. 5C is a diagram showing the frequency characteristics of signal components contained in the reduced image on which the filter processing of the present embodiment is applied. FIG. 5C shows the signal components 145 contained in the reduced image of the natural image on which the filter processing is applied, and the signal components 165 contained in the reduced image of the wire frame image on which the filter processing is applied. It should be noted that FIG. 5C also shows frequency characteristics 140 of signal components contained in a reduced image obtained by reducing a natural image, and frequency characteristics 160 (FIG. 5A) of signal components contained in a reduced image obtained by reducing a wire frame image, when filter processing is not performed.

In the present embodiment, filter processing is applied on a natural image, based on the filter characteristics 148 (FIG. 5B) with the first filter coefficient. Thus, the high frequency components of the signal components 140 contained in the reduced image obtained by reducing the natural image are reduced to the signal components 145. On the other hand, filter processing is applied on a wire frame image, based on the filter characteristics 168 (FIG. 5B) with the second filter coefficient. Thus, the high frequency components of the signal components 160 contained in the reduced image obtained by reducing the wire frame image are reduced to the signal components 165. In this way, the filter characteristic setting unit 20 makes the filter coefficient different between the natural image and the wire frame image. This allows the frequency components in the signal components 165 contained in the reduced image of the wire frame image on which the filter processing is applied to be reduced to the same level as the high frequency components in the signal components 145 contained in the reduced image of the natural image on which the filter processing is applied.

For example, when the image indicated by the image data is a natural image, the filter characteristic setting unit 20 sets, as the first filter coefficient, a value at which relatively small amount of high frequency components are suppressed, the interpolation curve is steep, and sharpness increases as interpolation characteristics. On the other hand, when the image indicated by the image data is a wire frame image, the filter characteristic setting unit 20 sets, as the second filter coefficient, a value at which a relatively large amount of high frequency components are suppressed, the interpolation curve is moderate, and sharpness is not emphasized as the interpolation characteristics.

In addition, the filter characteristic setting unit 20 refers to the reference table (Table 1) of the appropriate second filter coefficient for the reduction rate of the wire frame image stored in the memory 100, and changes the second filter coefficient based on the reduction rate set based on the image resolution information of the image data and the window resolution information (window size) of the display unit.

It should be noted that the memory 100 may store in advance first filter coefficients appropriate for the reduction rates of a natural image as the reference table (Table 1). The filter characteristic setting unit 20 may refer to this reference table to change the first filter coefficient based on the reduction rate set based on the image resolution information and the display window resolution information.

Returning to FIG. 4, the filtering processor (first filtering processor) 30 performs filter processing on the image data based on the filter coefficient (first filter coefficient or second filter coefficient) output from the filter characteristic setting unit 20 to generate filtered image data. As the filtering processor 30, for example, an interpolation filter circuit of bicubic method (4 pixels×4 pixels) is used.

Figure 6:
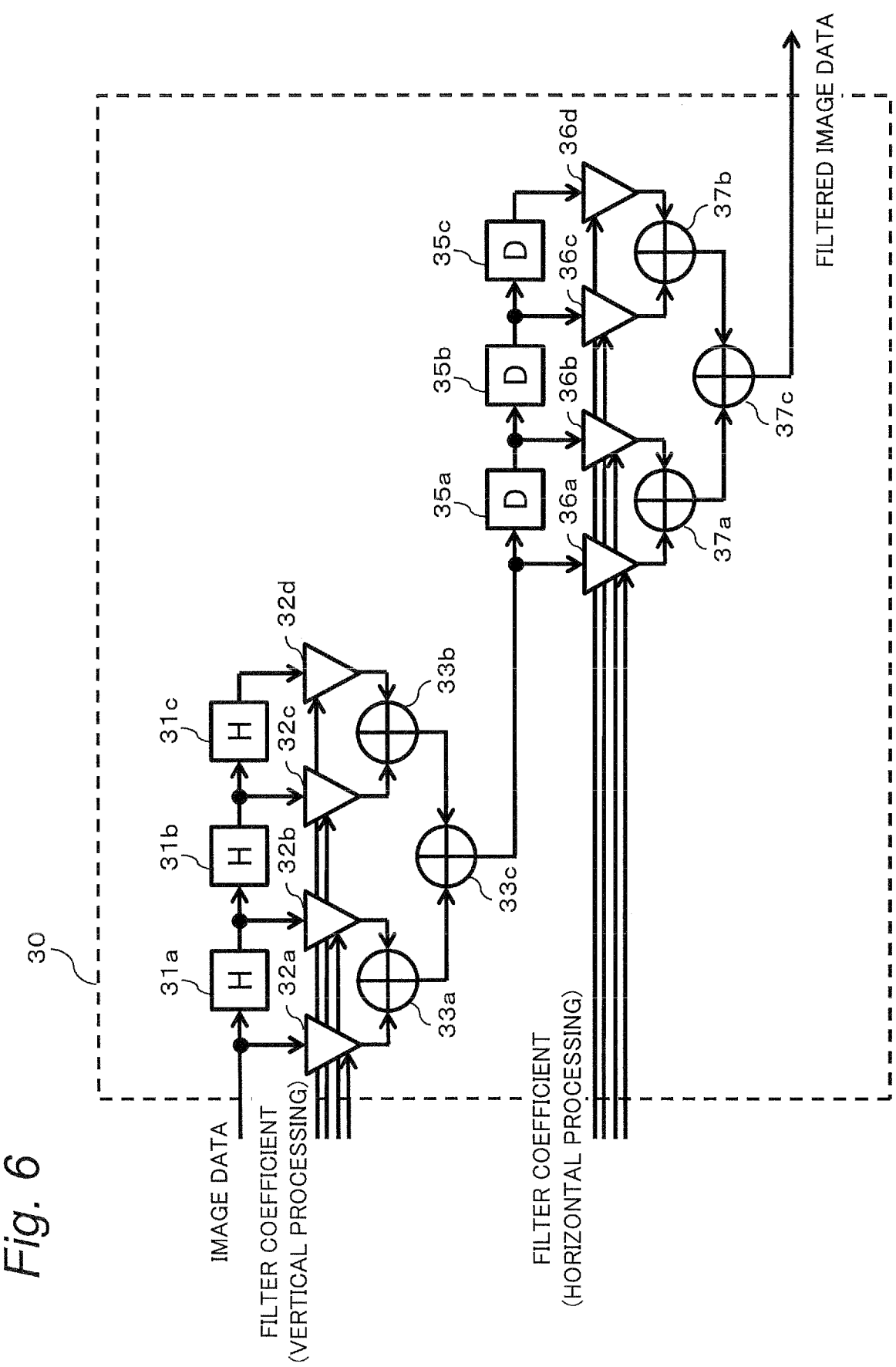
FIG. 6 is a block diagram showing an example of the configuration of a filtering processor (first embodiment).

FIG. 6 is a block diagram showing an example of the configuration of the filtering processor 30. The filtering processor 30 includes one-line delay units 31a to 31c, coefficient multipliers 32a to 32d, adders 33a to 33c, one-pixel delay units 35a to 35c, coefficient multipliers 36a to 36c, and adders 37a to 37c.

The one-line delay units 31a to 31c, the coefficient multipliers 32a to 32d, and the adders 33a to 33c add the pixel values (luminance values or hue values) of four pixel lines aligned in the vertical direction to obtain one added pixel line. Then, the one-pixel delay units 35a to 35c, the coefficient multipliers 36a to 36c, and the adders 37a to 37c add the pixel values of the four pixels arranged in the horizontal direction within the added pixel line to obtain one added pixel. In this case, each of the coefficient multipliers 32a to 32d and the coefficient multipliers 36a to 36c is added weight based on the filter coefficient "a". Then, the pixel value of the added pixel is taken as the pixel value of the new interpolation pixel.

Specifically, each of the one-line delay units 31a to 31c gives a delay of one pixel line to input pixel data. Thus, respective pixel values of different pixel lines are input into the coefficient multipliers 32a to 32d.

Each of the coefficient multipliers 32a to 32d obtains the interpolation coefficient k(d) in the vertical direction as shown in the following equations based on the filter coefficient "a".

$$k(d) = (a+2)d^3 - (a+3)d^2 + 1, \ 0 \leq d < 1 \quad (1\text{-}1)$$

$$k(d) = ad^3 - 5ad^2 + 8ad - 4a, \ 1 \leq d < 2 \quad (1\text{-}2)$$

$$k(d) = 0, \ 2 \leq d \quad (1\text{-}3)$$

"d" denotes the distance in the vertical direction from the interpolation pixel where the distance between adjacent pixels is set as 1. Each of the coefficient multipliers 32a to 32d multiplies the pixel value of the input pixel by the obtained interpolation coefficient k(d).

The adder 33a adds the pixel values of the pixel lines from the coefficient multiplier 32a and the pixel value of the pixel line from the coefficient multiplier 32b to make one pixel line from the two pixel lines. The adder 33b adds the pixel values of the pixel lines from the coefficient multiplier 32c and the pixel value of the pixel line from the coefficient multiplier 32d to make one pixel line from the two pixel lines. The adder 33c adds the pixel values of the pixel lines from the adder 33a and the pixel value of the pixel line from the adder 33b to make one added pixel line from the two pixel lines.

Next, each of the one-pixel delay units 35a to 35c provides a delay of one pixel to the pixel value of the input added pixel line, respectively. Respective pixel values of different pixels are input into the coefficient multipliers 36a to 36c.

Each of the coefficient multipliers 36a to 36d obtains the interpolation coefficient k(d) in the vertical direction as shown in Equations (1-1) to (1-3) based on the filter coefficient "a". In Equations (1-1) to (1-3), "d" is replaced with the distance in the horizontal direction from the interpolation pixel. Each of the coefficient multipliers 36a to 36d multiplies the pixel value of the input pixel by the obtained interpolation coefficient k(d).

The adder 37a adds the pixel value of the pixel from the coefficient multiplier 36a and the pixel value of the pixel from the coefficient multiplier 36b to obtain one pixel from two pixels. The adder 37b adds the pixel value of the pixel from the coefficient multiplier 36c and the pixel value of the pixel from the coefficient multiplier 36d to obtain one pixel from two pixels. The adder 37c adds the pixel value of the pixel from the adder 37a and the pixel value of the pixel from the adder 37b to obtain one added pixel (interpolation pixel) from the two pixels.

Repeating such an interpolation processing while shifting one pixel at a time generates filtering image data including interpolation pixels. In the filtering image data thus generated, the spatial change amount of the pixel value of the interpolation pixel is reduced (moderated), and as a result, the amount of the high frequency components is reduced.

In this case, switching the filter coefficient "a" according to whether the image indicated by the input image data is a natural image or a wire frame image optimally controls the degree of reduction in high frequency components. For example, when the image indicated by the image data is a natural image, the filter characteristic setting unit 20 shown in FIG. 4 sets, as the first filter coefficient, a value (for example, −2) at which relatively small amount of high frequency components are suppressed, the interpolation curve is steep, and sharpness increases as interpolation characteristics. On the other hand, when the image indicated by the image data is a wire frame image, the filter characteristic setting unit 20 sets, as the second filter coefficient, a value (for example, −0.5) at which a relatively large amount of high frequency components are suppressed, the interpolation curve is moderate, and sharpness is not emphasized as the interpolation characteristics.

Thereafter, the display processor 300 generates a display image based on the screen configuration set by the operation unit 500, arranges the filtered image data from the filtering unit 200 in the display image, and causes the display unit 400 to display the display image.

Next, an example in which a high reduction rate is set is shown. FIGS. 7A and 7B are diagrams showing the frequency characteristics of a wire frame image on which the filter processing of the present embodiment is applied. FIG. 7A is a diagram showing frequency characteristics corresponding to that of FIG. 1B. FIG. 7B is a diagram showing frequency characteristics corresponding to that of FIG. 1C. That is, FIG. 7B shows the characteristics at a higher reduction rate than that of FIG. 7A.

FIG. 7A shows the signal components 165 contained in the wire frame image on which the filter processing of the present embodiment is applied and, the signal components (shown folded back) 166 with a frequency higher than the Nyquist frequency fnd of the display unit in the signal components 165. FIG. 7A also shows the signal components 160 contained in the wire frame image when filter processing is not performed, indicated with a broken line, and the signal components 150 (FIG. 1B) contained in the image before reduction, indicated with a broken line (for the sake of clarity, different type from that in FIG. 1B). As shown in FIG. 7A, by performing the filter processing of the present embodiment to suppress high frequency components, the high frequency components of the signal components 160 contained in the wire frame image can be reduced to the high frequency components of the signal components 165. In particular, it is possible to reduce the signal components (shown folded back) 166 having a frequency higher than the Nyquist frequency fnd of the display unit, that is, aliasing noise.

FIG. 7B shows the signal components 175 contained in the wire frame image on which the filter processing of the present embodiment is applied, and the signal components (shown folded back) 176 with a frequency higher than the Nyquist frequency fnd of the display unit in the signal components 175. FIG. 7B also shows the signal components 170 contained in the wire frame image when filter processing is not performed, with a broken line, and the signal components 150 (FIG. 1C) contained in the image before reduction indicated with a broken line (for the sake of clarity, different type from that in FIG. 1C). In the filter processing of this embodiment, the filter coefficient is changed according to the reduction rate. Thus, higher reduction rate of the image suppresses more high frequency components. Therefore, when the reduction rate is high, as shown in FIG. 7B, the signal components 170 contained in the reduced image of the wire frame image are reduced to the signal components 175 in the high frequency region, and are reduced to the same level as the signal components 165 for the low reduction rate of the image shown in FIG. 7A. In particular, the signal components (shown folded back) 176 having a frequency higher than the Nyquist frequency fnd of the display unit, that is, the aliasing noise can be reduced to the same level as the signal components 166 for the low reduction rate of the image shown in FIG. 7A.

Figure 8:
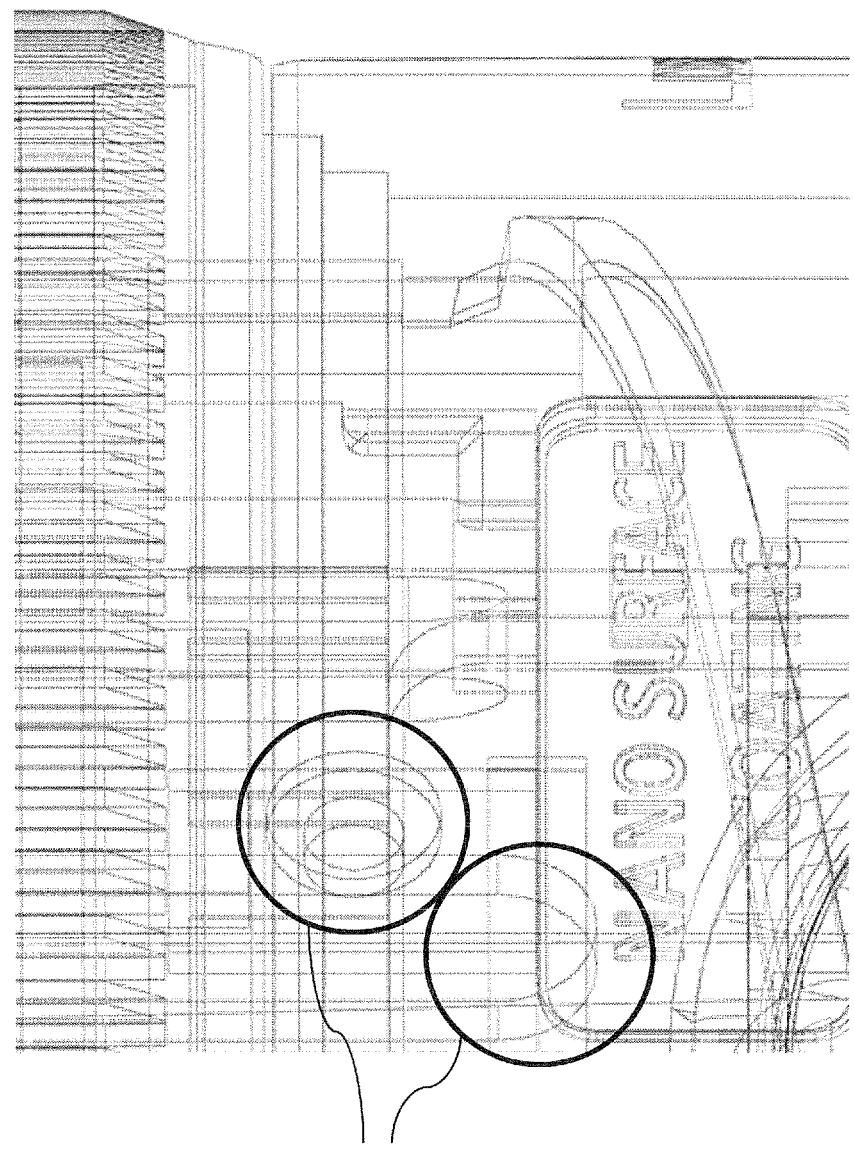
FIG. 8 is a diagram showing an example of a display when a wire frame image on which filter processing of the first embodiment is performed is displayed.

FIG. 8 is a diagram showing an example of a display for a wire frame image on which filter processing of the present embodiment is applied. In FIG. 8, similarly to FIG. 2, the image is reduced in size from 3840 pixels to 2000 pixels in the horizontal direction. In the present embodiment, performing of filter processing suppresses high frequency components. Thus even when the wire frame image is reduced and displayed, aliasing noise can be reduced as compared with the case in FIG. 2, and the occurrence of jaggy can be suppressed (for example, see the circular range 180).

1-3. Effects and the Like

As described above, in the present embodiment, the display device 1 includes the wire frame image determining unit 10, the filter characteristic setting unit 20, the filtering processor 30, the display processor 300, and the display unit 400. The wire frame image determining unit 10 determines whether or not the image indicated by the image data is a wire frame image. When the image indicated by the image data is not a wire frame image, the filter characteristic setting unit 20 sets filter characteristics so as to suppress the high frequency components of the image. When the image indicated by the image data is a wire frame image, the filter characteristic setting unit 20 sets filter characteristics so as to suppress high frequency components more than the high frequency components when the image indicated by the image data is not a wire frame image. Based on the filter characteristics set by the filter characteristic setting unit 20, the filtering processor 30 performs reduction processing while performing filter processing on the image indicated by the image data to generate a filtered image. The display processor 300 generates a display image, and inputs the filtered image to arrange the filtered image on the display image. The display unit 400 displays the display image.

In this way, for a wire frame image, the filter processing to sufficiently suppress high frequency components is performed. This allows aliasing noise to be reduced and the occurrence of jaggy to be suppressed even when the wire frame image is displayed in a reduced size. On the other hand, for a natural image, the filter processing to relatively less suppressing high frequency components is performed. This allows a high resolution feeling to be obtained even when the natural image is displayed in a reduced size. As a result, good display image quality can be obtained in each image.

Second Embodiment

In the first embodiment, a bicubic method of 4 pixels×4 pixels is adopted as the filtering processor 30 so as to achieve suppression of a large amount of high frequency components at a high reduction rate. Therefore, in the first embodiment, the processing time of the filtering processor 30 is relatively long. In the second embodiment, the processing time of the filtering processor 30 is shortened.

Specifically, in the second embodiment, a reduced image is generated by previously suppressing the high frequency components of the original image and by reducing the original image at a predetermined reduction rate, and the reduced image is stored in the memory 100. Thus, the filtering processor 30 only has to suppress the high frequency components by an amount determined based on the difference between the predetermined reduction rate of the reduced image and the reduction rate of the actual display image from the previously generated reduced image, so that the suppression amount of the high frequency components in the filtering processor 30 can be reduced. Therefore, a simple filter of 2 pixels×2 pixels can be adopted as the filtering processor 30, and the processing time of the filtering processor 30 can be shortened. In the following, the display device of the second embodiment is described in detail.

The configuration of the display device of the second embodiment is basically the same as that of the first embodiment described with reference to FIG. 3, but the function and operation of the filtering unit 200 are different from those described above.

Figure 9:
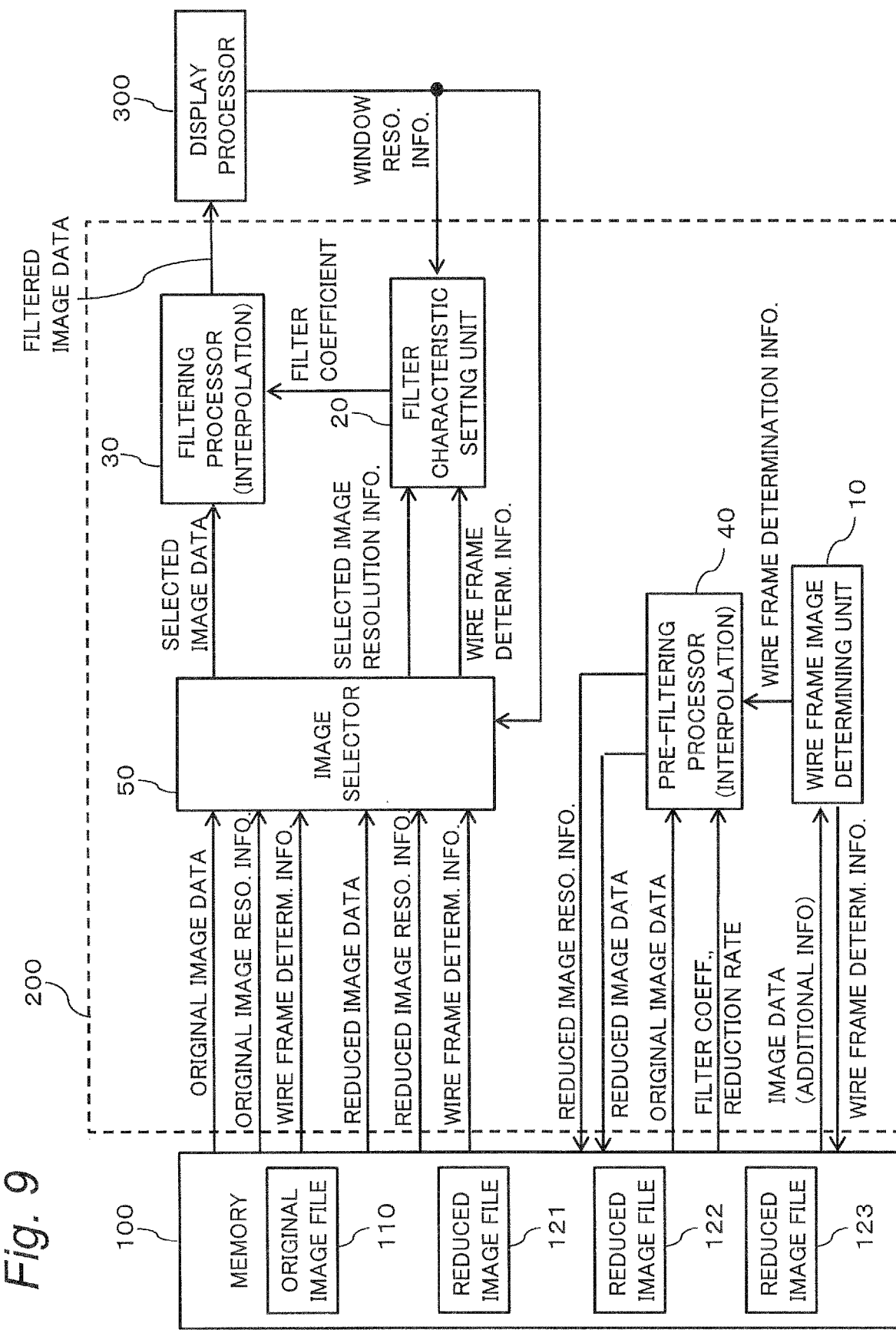
FIG. 9 is a block diagram showing a functional configuration of a filtering unit of a display device according to a second embodiment.

The specific configuration and operation of the filtering unit 200 according to the second embodiment is described with reference to FIG. 9. FIG. 9 is a diagram showing a functional configuration of the filtering unit 200 according to the second embodiment. The filtering unit 200 further has functions of a pre-filtering processor (second filtering processor) 40 and an image selector 50. The memory 100 stores in advance a predetermined reduction rate of the reduced image to be generated and a predetermined filter coefficient for suppressing an amount of high frequency components based on the reduction rate in the form of a reference table, as the filter coefficient-reduction rate information of the pre-filter processing.

For the pre-filtering processor 40, the interpolation filter circuit of the bicubic method of 4 pixels×4 pixels adopted in the filtering processor 30 of the first embodiment is used. When the wire frame determination information from the wire frame image determining unit 10 indicates a wire frame image, the pre-filtering processor 40 performs the same filter processing as that of the filtering processor 30 described above. In this case, the pre-filtering processor 40 suppresses high frequency components in the signal components contained in the original image indicated by the original image data based on the predetermined filter coefficient indicated by the filter coefficient-reduction rate information of the pre-filter processing from the memory 100, and reduces the original image based on the predetermined reduction rate indicated by the filter coefficient-reduction rate information of the pre-filter processing to generate reduced image data. The pre-filtering processor 40 generates a plurality of pieces of reduced image data with a plurality of different predetermined reduction rates. Each of these reduced image data is associated with additional information (reduced image resolution information and wire frame determination information) and is stored in the memory 100 as a reduced image file 121, 122, or 123. That is, the memory 100 stores reduced image data obtained by performing filter processing on a wire frame image and reducing the wire frame image at a predetermined reduction rate.

When the wire frame determination information from the wire frame image determining unit 10 does not indicate a wire frame image (when the image indicated by the image data is a natural image), the pre-filtering processor 40 does not generate a reduced image, since it is not necessary to suppress high frequency components much in the case of a natural image as described above.

Based on a reduction rate determined according to the resolution information of the original image and the display window resolution information, the image selector 50 selects the reduced image data with a reduction rate closest to and not more than the determined reduction rate, and additional information for the reduced image data. In the following, with reference to FIG. 10, a specific example of selection of reduced image data and its additional information by the image selector 50 is described.

Figure 10:
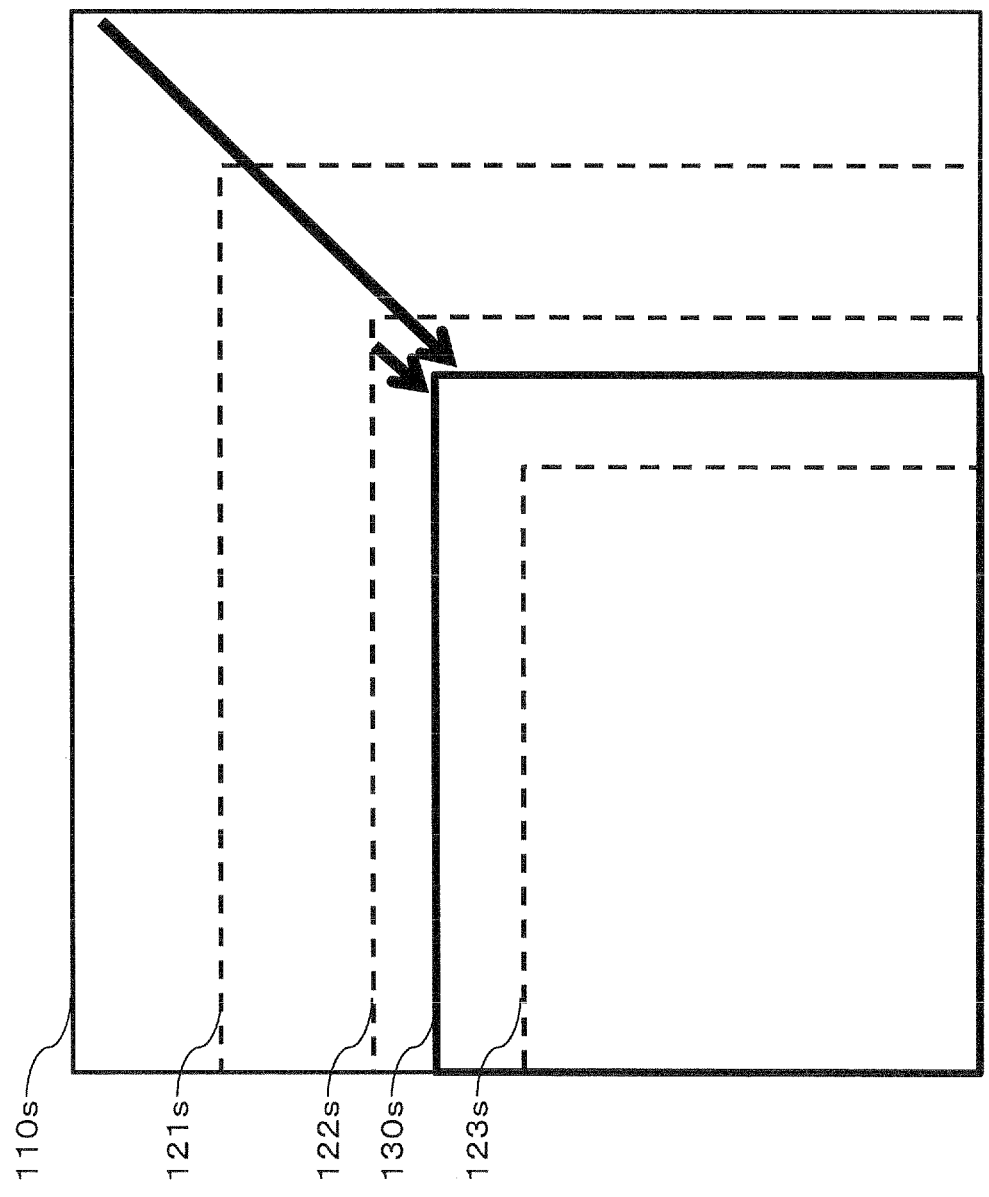
FIG. 10 is a diagram showing a relationship between sizes of an original image, reduced images, and a display image.

This specific example assumes the case where the memory 100 stores in advance reduced image files 121, 122, and 123 reduced at respective three kinds of reduction rates in addition to the original image file 110, and the reduction rate of the display window is set in the display processor 300. FIG. 10 is a diagram showing the relationship among the sizes of the original image, the reduced images, and the display image. In FIG. 10, the image size 110s is the size of the original image indicated by the original image data of the original image file 110. The image sizes 121s, 122s, and 123s are respectively the sizes of the reduced images indicated by the reduced image data of the reduced image files 121, 122, and 123. The image size 130s is the size of the display image determined based on the reduction rate set on the display unit. In this situation, the image selector 50 selects the reduced image data of the image size 122s which is larger than and closest to the image size 130s of the display image.

Then, the reduced image of the image size 122s is reduced to generate a display image of the image size 130s. In this case, the reduction rate is lower as compared with the case of generating a display image of the image size 130s from the original image of the image size 110s. Therefore, the filtering processor 30 only has to suppress the high frequency components by an amount determined based on the difference between the reduction rate of the reduced image of the image size 122s and the reduction rate of the display image, so that the suppression amount of the high frequency components in the filtering processor 30 can be reduced. In short, preparing a reduced image beforehand and using the reduced image in reduction processing allows the reduction rate in the reduction processing to be smaller, so that the load of the reduction processing can be reduced.

The filter characteristic setting unit 20 sets the filter coefficient to the first filter coefficient or the second filter coefficient as described above, based on the wire frame determination information of the selected image indicated by the selected image data. In this case, the filter characteristic setting unit 20 changes the filter coefficient based on the resolution information of the selected image and the resolution information of the display window from the display processor 300.

The filtering processor 30 performs filter processing on the selected image data based on the filter coefficient (first filter coefficient or second filter coefficient) from the filter characteristic setting unit 20 to generate filtered image data. In the present embodiment, the suppression amount of the high frequency components in the filtering processor 30 is reduced, and accordingly an interpolation filter circuit including a simplified bicubic method, for example, a filter of 2 pixels×2 pixels is used as the filtering processor 30.

Figure 11:
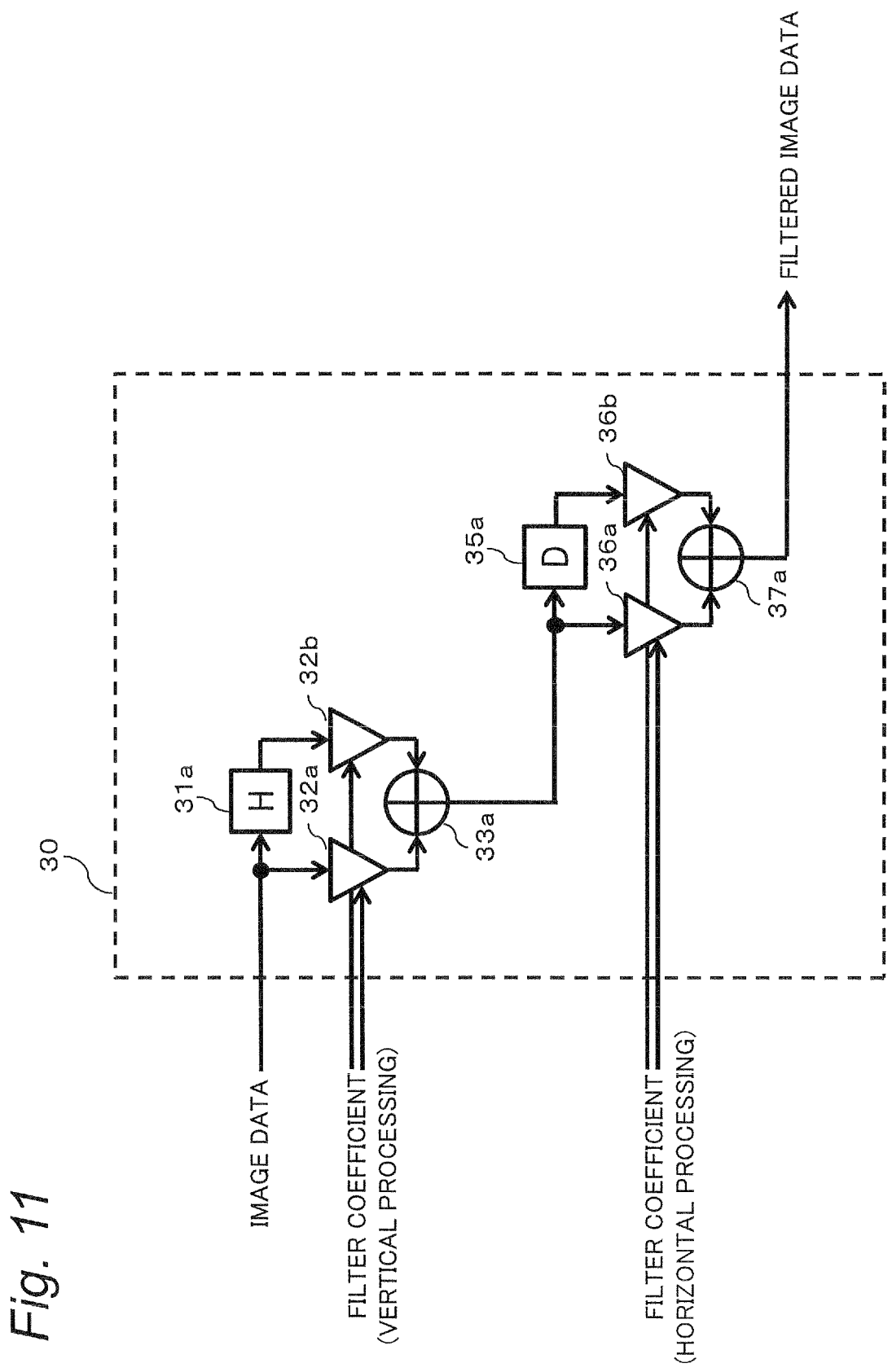
FIG. 11 is a block diagram showing an example of a configuration of a filtering processor (second embodiment).

FIG. 11 is a block diagram showing an example of the configuration of the filtering processor 30 of the second embodiment. The filtering processor 30 includes a one-line delay unit 31a, coefficient multipliers 32a and 32b, an adder 33a, a one-pixel delay unit 35a, coefficient multipliers 36a and 36b, and an adder 37a. For the operation of the simplified bicubic interpolation filter circuit of 2 pixels×2 pixels, please refer to the description of the operation of the bicubic interpolation filter circuit of 4 pixels×4 pixels described above. In this case, each of the coefficient multipliers 32a and 32b obtains the interpolation coefficient k(d) in the vertical direction as shown in the equations (2-1) and (2-2) based on the filter coefficient "a".

$$k(d)=(a+2)d^3-(a+3)d^2+1, \ 0 \leq d < 1 \qquad (2\text{-}1)$$

$$k(d)=0, \ 1 \leq d \qquad (2\text{-}2)$$

Thus, as compared with the bicubic method of 4 pixels×4 pixels, according to the simplified bicubic method of 2 pixels×2 pixels, the processing time of the one-line delay units 31b and 31c and the adder 33c can be reduced. Further, the equation for calculating the interpolation function k(d) from the filter coefficient "a" in the coefficient multipliers 32a and 32b can be made simpler than the equations (1-1) to (1-3). Therefore, the processing time can be shortened.

As described above, according to the second embodiment, the pre-filtering processor 40 previously suppresses the high frequency components of the original image and generates a reduced image that is reduced at a predetermined reduction rate. Thus, the filtering processor 30 only has to suppress the high frequency components by an amount determined based on the difference between the predetermined reduction rate of the reduced image and the reduction rate of the actual display image from the previously generated reduced image, so that the suppression amount of the high frequency components in the filtering processor 30 can be reduced. Therefore, a simplified bicubic method of 2 pixels×2 pixels can be adopted as the filtering processor 30, and the processing time (time of real-time processing) of the filtering processor 30 can be shortened.

In the second embodiment, the pre-filtering processor 40 may perform only suppression of high frequency components without performing reduction processing. It should be noted that the performing of the reduction processing allows reducing the size of the image data to be stored in the memory 100 and reducing the use region of the memory 100. In addition, the processing of the pre-filtering processor 40 may be executed during idle time in which load of display processing is low, after the original image file 110 is stored in the memory 100.

Third Embodiment

In the third embodiment, a reduced image is previously generated based on the display window size which is often set. Specifically, the display window size set in the past is stored. Statistical analysis is performed on the display window sizes. Reduced images having sizes corresponding to the display window sizes set a predetermined number of times or more are previously generated and stored. Thus, it is possible to previously narrow down reduced images to be stored, to reduce the number of reduced images to be stored, and to reduce a used region of the memory.

The configuration of the display device of the third embodiment is basically the same as that of the first embodiment described with reference to FIG. 3, but the function and operation of the filtering unit 200 are different from those described above.

Figure 12:
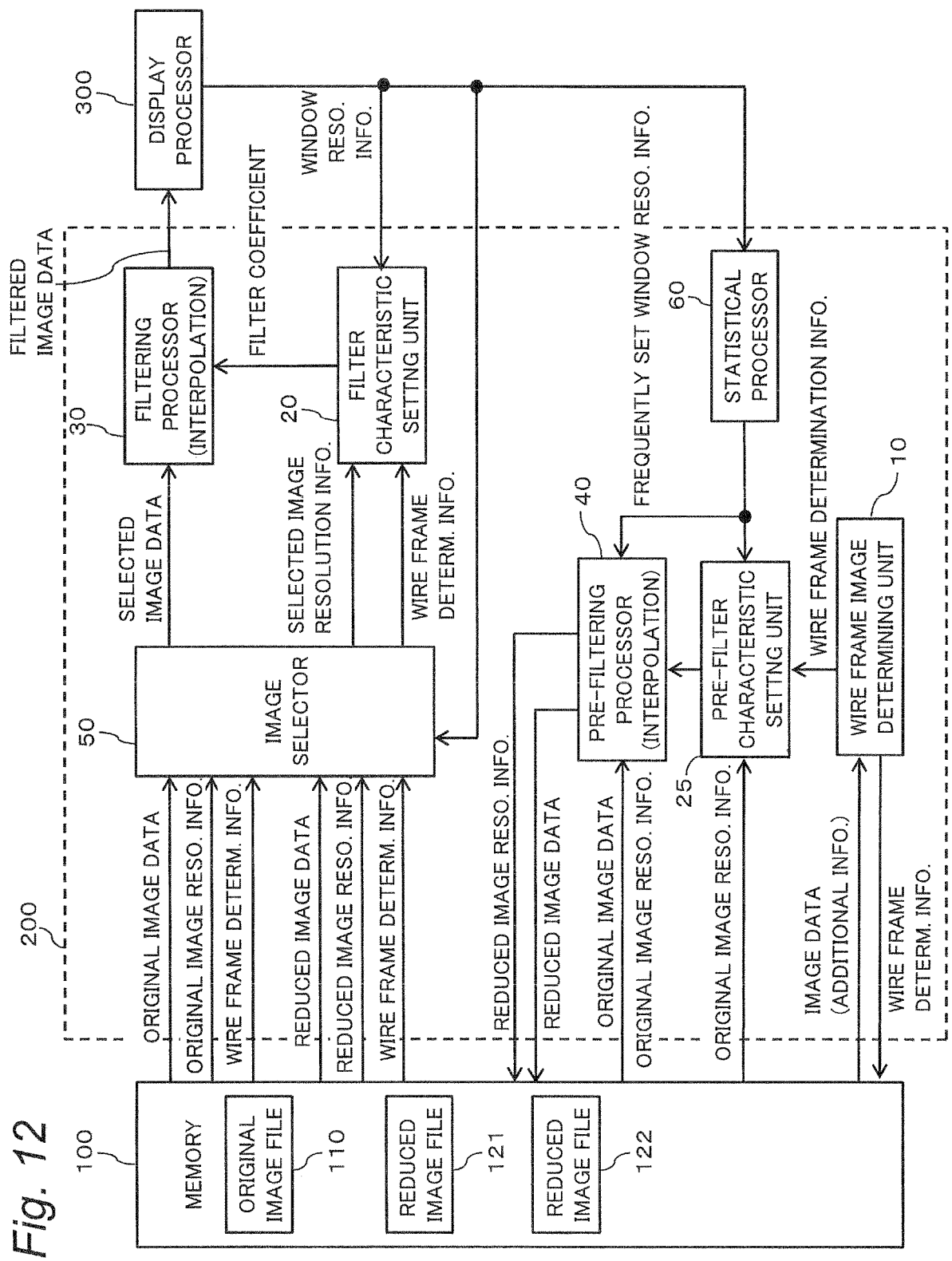
FIG. 12 is a block diagram showing a functional configuration of a filtering unit of a display device according to a third embodiment.

The specific operation of the filtering unit 200 according to the third embodiment is described with reference to FIG. 12. FIG. 12 is a diagram showing a functional configuration of the filtering unit 200 according to the third embodiment. The filtering unit 200 further has functions of a statistical processor 60 and a pre-filter characteristic setting unit (second filter characteristic setting unit) 25 in the configuration of the second embodiment shown in FIG. 9.

Based on the window resolution information from the display processor 300, the statistical processor 60 stores the display window sizes set in the past and performs statistical analysis. The statistical processor 60 outputs the window resolution information related to the display window size that is set a predetermined number of times or more, as frequently set window resolution information.

When the wire frame determination information from the wire frame image determining unit 10 indicates a wire frame image, the pre-filter characteristic setting unit 25 sets a filter coefficient (third filter coefficient) of the pre-filter processing so as to suppress high frequency components of the image indicated by the original image data and to reduce the image. The pre-filter characteristic setting unit 25 changes the filter coefficient of the pre-filter processing based on the reduction rate set based on the image resolution information of the original image data and the frequently set window resolution information.

Based on the filter coefficient of the pre-filter processing from the pre-filter characteristic setting unit 25, the pre-filtering processor 40 suppresses high frequency components of the original image indicated by the original image data, and reduces the original image based on the reduction rate set based on the image resolution information of the original image data and the frequently set window resolution information to generate reduced image data. Based on the reduction rate set based on the image resolution information of the original image data and the frequently set window resolution information, and the filter coefficient of the pre-filter processing corresponding to the reduction rate, the pre-filtering processor 40 generates a plurality of pieces of reduced image data with a plurality of different reduction rates. Each of these reduced image data is associated with additional information (reduced image resolution information and wire frame determination information) and is stored in the memory 100 as a reduced image file 121 or 122. That is, the reduction rate of the reduced image data previously stored in the memory 100 is set based on the reduction rate set on the past display windows.

In this way, according to the third embodiment, reduced images corresponding to frequently displayed window sizes often set in the past are previously generated and stored. Thus, it is possible to previously narrow down reduced images to be stored, to reduce the number of reduced images to be stored, and to reduce the used region of the memory 100.

When a reduced image having a size matching the size of the display image is previously generated, the filtering processor 30 may be configured not to perform the filter processing. For example, the filtering processor 30 may output directly pixel values of any one image of the input images without performing interpolation processing. Specifically, in FIG. 6, only one of the coefficient multipliers 32a to 32d may set the interpolation coefficient k(d)=1, and the other coefficient multipliers may set the interpolation coefficient k(d)=0. In addition, only one of the coefficient multipliers 36a to 36c may set the interpolation coefficient k(d)=1, and the other coefficient multipliers may set the interpolation coefficient k(d)=0.

Other Embodiments

As described above, the first to third embodiments are described as examples of the art disclosed in the present application. However, the art in the present disclosure is not limited thereto, and can also be applied to embodiments in which changes, substitutions, additions, omissions, and the like are made as appropriate. In addition, it is also possible to combine each component described in the first to third embodiments to form a new embodiment. Thus, in the following, other embodiments is exemplified.

(1) In the present embodiment, the wire frame image determining unit 10 determines whether the image indicated by the image data is a wire frame image based on the amount of the high-frequency components in the signal components contained in the image indicated by the image data, but the present disclosure is not limited thereto. The number of colors used in the wire frame image drawn with thin lines by using a CAD tool is small, and thus the wire frame image determining unit 10 may determine whether the image indicated by the image data is a wire frame image based on the number of colors of the image indicated by the image data. In addition, the wire frame image determining unit 10 may determine whether the image indicated by the image data is a wire frame image based on the application information (CAD and viewer) for creating the image data, the user setting information, or the like, included in the additional information associated with the image data.

(2) As the filtering processor 30 of the first embodiment and the pre-filtering processor 40 of the second and third embodiments, an interpolation filter circuit of a bicubic method of 4 pixels×4 pixels is exemplified, but the present disclosure is not limited thereto. Various filters capable of dealing with suppression in a large amount of high frequency components at a high reduction rate can be applied to the processor.

(3) As the filtering processor 30 of the second and third embodiments, a simplified bicubic interpolation filter circuit of 2 pixels×2 pixels is exemplified, but the present disclosure is not limited thereto. For example, various kinds of simple filters of the nearest-neighbor method and the like can be applied to the processor.

(4) In the second and third embodiments, the image selector 50 selects reduced image data with a reduction rate not more than the reduction rate of the display image, but may select reduced image data (reduced image data of the image size 123s in FIG. 10) with a reduction rate higher than the reduction rate of the display image. In this case, the display processor 300 performs image enlargement processing. In addition, in this case, the filtering processor 30 does not have to suppress high frequency components.

As described above, the embodiments are described as the exemplification of the art in the present disclosure. To this end, the accompanying drawings and detailed description are provided.

Therefore, among the components described in the accompanying drawings and the detailed description, not only the components essential for solving the problem, but also the component not essential for solving the problem may be included in order to exemplify the above art. Therefore, it should not be recognized that these non-essential components are essential immediately because these non-essential components are described in the accompanying drawings and the detailed description.

In addition, since the above embodiment is for illustrating the art in the present disclosure, various changes, substitutions, additions, omissions, and the like can be made within the scope of the claims or the equivalent thereof.

INDUSTRIAL APPLICABILITY

The present disclosure can be applied to a display device for displaying an image by reducing or enlarging the image.

The invention claimed is:
1. A display device comprising:
    an image determining unit configured to determine whether an image indicated by image data is a wire frame image drawn with thin lines;
    a first filter characteristic setting unit configured to set filter characteristics so as to suppress high frequency components of the image when the image indicated by the image data is not the wire frame image, and set filter characteristics so as to suppress more high frequency components when the image indicated by the image data is the wire frame image, as compared with suppressed amount of high frequency components when the image indicated by the image data is not the wire frame image;
    a first filtering processor configured to reduce the image indicated by the image data while performing filter processing on the image indicated by the image data to generate a filtered image, based on the filter characteristics set by the first filter characteristic setting unit;
a display processor configured to generate a display image and input the filtered image to arrange the filtering image on the display image; and
a display unit configured to display the display image.

2. The display device according to claim 1, wherein the first filter characteristic setting unit changes the filter characteristics based on a reduction rate set based on information on resolution of the image indicated by the image data and information on resolution of a display window of the display unit.

3. The display device according to claim 1, wherein the image determination unit determines that the image indicated by the image data is the wire frame image, when an amount of high frequency components in signal components of the image indicated by the image data is not less than a predetermined amount.

4. The display device according to claim 1, wherein the image determination unit determines that the image indicated by the image data is the wire frame image, when a number of colors in the image indicated by the image data is not more than a predetermined number.

5. The display device according to claim 1, wherein the image determining unit determines whether the image indicated by the image data is the wire frame image, based on information indicating an application that creates the image data.

6. The display device according to claim 1, wherein the image determining unit determines whether the image indicated by the image data is the wire frame image based on information indicating a wire frame image which is set in advance.

7. The display device according to claim 1, further comprising a data storage unit configured to store the image data.

8. The display device according to claim 7, wherein
the data storage unit stores reduced image data on which filter processing is performed and is reduced at a predetermined reduction rate,
the display device further comprises an image selection unit configured to select either one of the image data and the reduced image data stored in the data storage unit based on a reduction rate set based on information on resolution of the image indicated by the image data and information on resolution of a display window of the display unit, and
the first filtering processor performs filter processing on an image indicated by the image data selected by the image selection unit to generate a filtering image.

9. The display device according to claim 8, further comprising a second filtering processor configured to perform filter processing on the image indicated by the image data and reduce the image indicated by the image data at a predetermined reduction rate to generate the reduced image data.

10. The display device according to claim 8, wherein the first filter characteristic setting unit changes the filter characteristics based on a reduction rate set based on information on resolution of the image indicated by the image data selected by the image selection unit and information on resolution of a display window of the display unit.

11. The display device according to claim 8, wherein a reduction rate of reduced image data previously stored in the data storage unit is set based on a reduction rate set on a past display window.

12. The display device according to claim 1, wherein the first filtering processor performs interpolation filter processing.

* * * * *